No. 734,088. PATENTED JULY 21, 1903.
T. J. PHILLIPS, W. G. HODGE & W. WHITE.
LOADING MACHINE.
APPLICATION FILED MAR. 14, 1902.
NO MODEL.
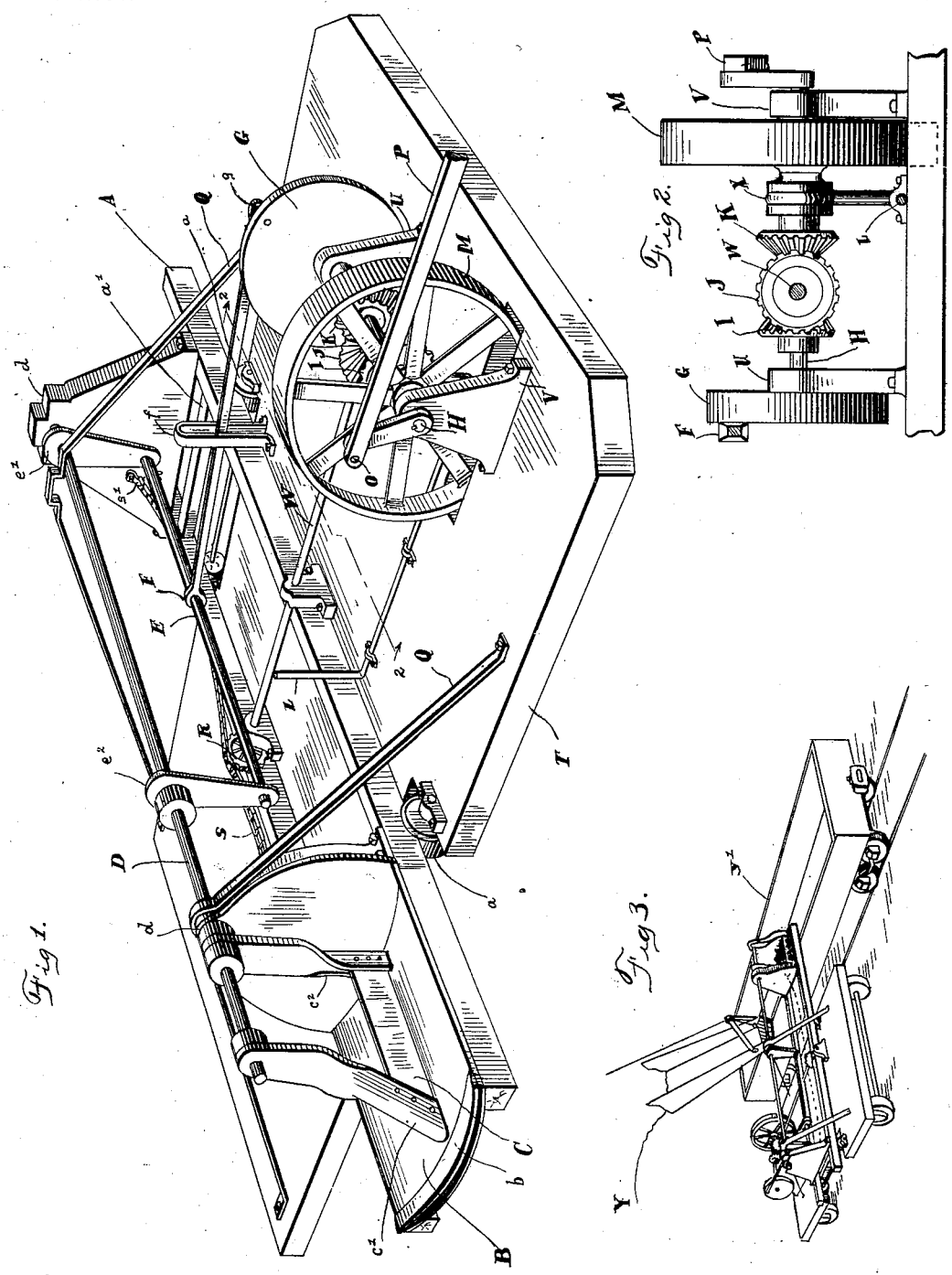
Witnesses:
Herman M. Krueger.
O. M. Warnick
Inventors:
Thomas J. Phillips
William G. Hodge
William White
By Charles H. Roberts their attorney.

No. 734,088. Patented July 21, 1903.

UNITED STATES PATENT OFFICE.

THOMAS J. PHILLIPS, WILLIAM G. HODGE, AND WILLIAM WHITE, OF OTTUMWA, IOWA.

LOADING-MACHINE.

SPECIFICATION forming part of Letters Patent No. 734,088, dated July 21, 1903.

Application filed March 14, 1902. Serial No. 98,144. (No model.)

*To all whom it may concern:*

Be it known that we, THOMAS J. PHILLIPS, WILLIAM G. HODGE, and WILLIAM WHITE, citizens of the United States, residing at Ottumwa, in the county of Wapello and State of Iowa, have invented a new and useful Loading-Machine, of which the following is a specification.

Our invention is related to loading machinery; and the object of our invention is to load coal, ore, grain, or other material into gondolas, box-cars, bins, the holds of vessels, or other receptacles or depositories easily and in a superior manner and with a great saving of time and manual labor. For this purpose we have invented a novel mechanism, represented in the accompanying drawings, in which—

Figure 1 is a perspective view of our loading-machine. Fig. 2 is a detail on section-lines 2 2 of Fig. 1. Fig. 3 shows an application of our device.

Similar letters refer to similar parts throughout the several views.

In the drawings, A represents the carriage or frame of our loading-machine, which may be constructed of wood. Upon the carriage A is a hopper B, preferably concave and made of steel, for holding the material to be loaded into the receptacles. The carriage is provided with rolls $a\ a\ a\ a$, on which it may travel longitudinally forward and back the length or breadth of the car or any length which may be permitted by the sprocket-chain S, which is adjusted to govern the play of the carriage.

$a'$ is a cross-brace on the frame for the support thereof.

Mounted on a rock-shaft D above the carriage in pillow-blocks $d\ d$ are first and second arms $c'\ c^2$, to which is attached the reciprocating shovel C. This shovel C is fitted with a lower edge preferably adapted to fit or sweep near the concave surface of the hopper or table upon which it operates. The hopper B has a thickened front lip or apron $b$ to retain the contents as against the action of the reciprocating shovel C. This lip does not present to the coal or material a steep wall as high as the sides of the hopper, but is, as its name indicates, a thickened lip whose margins follow substantially the concave curve of the hopper, and while retaining the contents of the hopper against the action of the shovel does not cramp such action by presenting an abrupt wall, and while retaining it does not absolutely prevent the material from being thrown forward.

M is a fly-wheel or balance-wheel connected by the pitman P with the engine or power which operates the machine. Gears I and K on the engine-shaft H connect with gear-wheel J and shaft W to turn sprocket-wheel R against sprocket-chain S to run the carriage forward and back to or from the car or receptacle which is being loaded.

F is a connecting-rod from the engine to rock-bar E of the machine and is attached by a crank to the disk or crank wheel G and serves to give, through bar E, a reciprocating motion to the shovel C.

X is a clutch operated by lever L, by means of which the gear-wheels I and K are connected with gear J and shaft W to run the loader frame or carriage out and in.

T is the foundation on which the machine rests. It is usually stationary. The carriage alone travels when the machine is in operation; but the machine may be mounted on wheels, as shown in Fig. 3.

The advantages of this machine in loading are that the coal or other material may be thrown high and over far enough to load the car or other receptacle to full capacity easily and without manual labor.

In operation when the machine is started up the shovel, swinging on its axis D, reciprocates laterally to and fro in the hollow hopper B, throwing off the contents of the hopper on both sides.

Our machine is useful in loading coal-cars at the mines, and Fig. 3 shows one of our loaders in which the load received from the coal-dump Y is being projected toward and over the car Y'.

It is apparent that the dimensions of our machine and of its parts may be changed somewhat without impairing the usefulness, so long as the same results are secured, and that any suitable material may be employed.

One advantage of our loader is that it can be moved in and out of the car or receptacle and operated without disconnecting the engine in any manner or reversing the power-shaft. All that is necessary in moving the carriage back and forth and in operating the machine is to start up the engine or power-shaft and throw the parts I and K together by the lever L to run the carriage forward into the car or receptacle and to throw the parts J and K together to run the carriage backward. This throws the power on the sprocket-wheel R, which engaging the sprocket-chain S and being reversed at will through the lever L runs the carriage and chain forward and back at the will of the operator.

Another advantage of our machine is that the transversely-reciprocating shovel C is not solid, but is preferably left open above C between the arms $c'$ $c^2$, so that when the coal, ore, or other material falls onto the hopper B as the shovel is in motion it is not all picked up and thrown at one sweep, but can fall back through this opening, thus lessening the strain. This open shovel might not be of so great advantage in machinery to move grain or other light material only, where a rapidly-rotating fan is sometimes used and the action is swift, so that the material would have no time nor chance to fall back and accommodate itself to the shovel; but our machine may be used for either light or heavy material, preferably the latter, and when shoveling ore or coal or any material too heavy, too bulky, or too fragile to be struck by a swift-running fan without damage to the material or to the fan it is important to have such opening in the shovel in order that the material may adjust itself against its own strain and may in a manner equalize the strain and the work. By "open shovel," therefore, we mean a device having a shoveling function and provided with a space above the shovel-blade and between its sustaining-arms. As this open shovel moves back and forth against a heavy mass of coal or ore on the hopper the surplus material falls backward through the arms of the reciprocating shovel upon the hopper, thus automatically relieving the shovel of any excessive load and automatically adjusting its own load, the surplus material being swept or shoveled away at the next reciprocation of the shovel.

The object of our invention is, in part, so to form and arrange the shovel, pan, and rock-shaft as to allow the coal to pass from the chute to the pan with as little obstruction as possible, and thereby to avoid breaking the coal, undue strain upon the shaft, and also to prevent the coal from bounding out of the pan; also, the rock-shaft is made to extend only a part of the way out over the open shovel and pan, so as not to obstruct the large lumps of coal in passing from the chute to the pan; also, if rock-shaft extends out too far over the length of the shovel and pan it would cause greater strain to be put on the rock-shaft and would break the coal more and cause some of the coal striking on it to rebound and not go into the pan, so as to allow the shovel to act upon it.

The sleeved connecting-rod F slips freely back and forth on the rock-bar E, allowing the power to be applied to the rod E to rock the shovel at any point of the rod presented by the advance or retreat of the carriage.

What we claim as new, and desire to secure by Letters Patent, is—

1. In a loading-machine operated from a power-shaft or engine, a reciprocating carriage, and a reciprocating shovel, and means to reciprocate the carriage and the shovel, without reversing the engine or the power-shaft, and without disconnecting the engine from the power-shaft, substantially as described and shown.

2. In a loading-machine the concave hopper with a thickened lip or retaining edge, substantially as described and shown.

3. In a loading-machine a traveling carriage having a sprocket-chain, a sprocket-wheel, and gears I, J and K, and lever and clutch L, X, substantially as described and shown.

4. In a loading-machine having a traveling carriage carrying a reciprocating shovel, a rock-bar rod of sufficient length to allow the travel of the carriage and a sleeved connecting-rod adapted to reciprocate the rock-bar rod and the shovel and to slide on the rock-bar rod as it moves forward and back, substantially as described and shown.

5. An improved coal-car-loading machine, comprising a suitable frame to be moved at right angles to a railroad-track, a curved pan, and an open shovel attached to said frame, and adapted to enter a car on the railroad-track, and receive coal from a chute; a rock-shaft, to which the shovel is secured, mounted on and carried by said frame, said rock-shaft having secured to it two arms a distance apart greater than the travel of the carriage, and a rod connecting these arms at their outer ends, through which the power is applied to rock the shaft, so that the shaft may be rocked at any point of its travel in and out of the car to be loaded, substantially as described and shown.

In testimony whereof we affix our signatures in presence of two witnesses.

THOMAS J. PHILLIPS.
WILLIAM G. HODGE.
WILLIAM WHITE.

Witnesses:
JOHN T. PHILLIPS,
MATHEW L. BYRNE.